(12) United States Patent
Nakamura et al.

(10) Patent No.: US 8,254,690 B2
(45) Date of Patent: Aug. 28, 2012

(54) INFORMATION PROCESSING APPARATUS, INFORMATION PROCESSING METHOD, AND PROGRAM

(75) Inventors: Akira Nakamura, Kanagawa (JP); Yoshiaki Iwai, Tokyo (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 1010 days.

(21) Appl. No.: 12/234,777

(22) Filed: Sep. 22, 2008

(65) Prior Publication Data

US 2009/0103814 A1 Apr. 23, 2009

(30) Foreign Application Priority Data

Oct. 19, 2007 (JP) .................................. 2007-273044
Oct. 19, 2007 (JP) .................................. 2007-273045

(51) Int. Cl.
*G06K 9/62* (2006.01)
(52) U.S. Cl. ......... 382/194; 382/199; 382/201; 382/219
(58) Field of Classification Search ........................ None
See application file for complete search history.

(56) References Cited

U.S. PATENT DOCUMENTS

2007/0098255 A1* 5/2007 Yokono .......................... 382/159
2009/0041340 A1* 2/2009 Suzuki et al. ................. 382/159

FOREIGN PATENT DOCUMENTS

| JP | 11-086004 A | 3/1999 |
|----|----|----|
| JP | 11-312243 A | 11/1999 |
| JP | 2002-259978 A | 9/2002 |
| JP | 2006-190201 A | 7/2006 |
| WO | WO 2006073076 A1 * | 7/2006 |

OTHER PUBLICATIONS

Office Action issued in Japanese Patent Application No. 2007-273044 on Oct. 27, 2011 (3 pages).

* cited by examiner

*Primary Examiner* — Brian P Werner
(74) *Attorney, Agent, or Firm* — Finnegan, Henderson, Farabow, Garrett & Dunner, L.L.P.

(57) ABSTRACT

An information processing apparatus that compares a query image and a model image and provides support information for discriminating a subject of the model image from a subject of the query image is disclosed. The information processing apparatus includes: a feature point extracting unit extracting one or more feature points from the model image; a feature describing unit describing features of the one or more feature points extracted by the feature point extracting unit; and a discrimination capability value calculating unit generating correlation images among the features described by the feature describing unit, the extracted model image, and one or more other model images for the one or more feature points extracted by the feature point extracting unit, and calculating a discrimination capability value indicating the degree of contribution to discriminating the subject of the model image on the basis of the correlation images.

9 Claims, 13 Drawing Sheets

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application Nos. JP 2007-273044 and JP 2007-273045 both filed in the Japanese Patent Office on Oct. 19, 2007, the entire contents of which being incorporated herein by reference.

BACKGROUND OF THE INVENTION

1. Field of the Invention

The present invention relates to an information processing apparatus, an information processing method, and a program, and more particularly, to an information processing apparatus, an information processing method, and a program capable of reliably recognizing an object of an image.

2. Description of the Related Art

In recent years, a texture-based general object recognizing method using a local feature has been proposed (see JP-A-2004-326693). The method is little affected by a variation in illumination and can enable robust object recognition. However, when the method is applied to an object having a small texture, the discrimination capability thereof is lowered.

In addition, Japanese Patent Application No. 2006-100705 filed by the inventors discloses a method of using edge information or support points to perform local feature matching on an object without a texture. That is, in the method, feature points are extracted from a model image and a query image, local features in the vicinities of the feature points are described, matching between features is performed, and an object of the model image is discriminated from an object of the query image using the number of matching pairs after outline (mismatch) removal using, for example, Hough transform or RANSAC.

SUMMARY OF THE INVENTION

However, the above-mentioned methods have the following three problems. As a result, a method of recognizing an object of an image more reliably than the above-mentioned methods is needed.

That is, first, when the appearance reproducibility of the positions of the feature points of the model image and the positions of the feature points of the query image is low, discrimination capability is significantly deteriorated. When the edge is used, the discrimination capability is greatly affected by the reproducibility of the edge of the model image and the edge of the query image.

Second, the recognition of a model is finally determined on the basis of the number of matching pairs of an inlier (after removing the match pairs). Therefore, the number of matching pairs between the objects from which a large number of feature points are extracted due to a complicated texture or outline is increased, and the number of match pairs between the objects having a simple texture or shape is decreased, regardless of the similarity between the object of the model image and the object of the query image.

Third, when support points are provided around the base point to improve the accuracy of matching, a standard for selecting the support point does not consider a difference between a plurality of model images.

Thus, it is desirable to reliably recognize an object of an image.

According to an embodiment of the invention, there is provided an information processing apparatus that compares a query image and a model image and provides support information for discriminating a subject of the model image from a subject of the query image. The information processing apparatus includes: a feature point extracting unit extracting one or more feature points from the model image; a feature describing unit describing features of the one or more feature points extracted by the feature point extracting unit; and a discrimination capability value calculating unit generating correlation images among the features described by the feature describing unit, the extracted model image, and one or more other model images for the one or more feature points extracted by the feature point extracting unit, and calculating a discrimination capability value indicating the degree of contribution to discriminating the subject of the model image on the basis of the correlation images.

Preferably, the information processing apparatus according to the above-mentioned embodiment further includes: a support point selecting unit using at least one of the one or more feature points extracted by the feature point extracting unit as a base point, and selecting, as a support point, the feature point whose discrimination capability value, which is calculated by the discrimination capability value calculating unit, is higher than that of the base point from the feature points in a predetermined range of the base point.

In the information processing apparatus according to the above-mentioned embodiment, preferably, the discrimination capability value calculating unit calculates the discrimination capability value on the basis of at least one of the average value and the maximum value of all the correlation images.

According to another embodiment of the invention, there is provided an information processing method of an information processing apparatus that compares a query image and a model image and provides support information for discriminating a subject of the model image and a subject of the query image. The information processing method including the steps of: extracting one or more feature points from the model image; describing features of the extracted one or more feature points; and generating correlation images among the described features, the extracted model image, and one or more other model images for the extracted one or more feature points, and calculating discrimination capability values indicating the degree of contribution to discriminating the subject of the model image on the basis of the correlation images.

According to still another embodiment of the invention, there is provided an information processing apparatus that compares a query image and a model image and discriminates a subject of the model image from a subject of the query image. The information processing apparatus includes: when N (N is an integer that is equal to or greater than 1) feature points are extracted from the model image and features of the extracted N feature points are described, a model dictionary having information indicating the N feature points and the features thereof registered therein, the model dictionary being provided inside or outside the information processing apparatus; a correlation image generating unit generating correlation images between the query image and the corresponding features for the N feature points of the model image registered in the model dictionary; a shift correlation image generating unit shifting the positions of pixels of the N correlation images generated by the correlation image generating unit corresponding to the positions of the feature points in the model image to generate N shift correlation images; a correlation sum image generating unit adding the pixel values of pixels of the N shift correlation images generated by the shift correlation image generating unit to generate a correlation sum image; and a determining unit determining whether the subject of the model image and the subject of the query image are matched with each other, on the basis of the correlation sum image generated by the correlation sum image generating unit.

In the information processing apparatus according to the above-mentioned embodiment, preferably, when correlation images among the described features, the extracted model image, and one or more other model images are generated for the one or more feature points of the model image registered in the model dictionary, and discrimination capability values indicating the degree of contribution to discriminating the subject of the model image are calculated on the basis of the correlation images, the discrimination capability values are registered in the model dictionary together with information indicating the corresponding feature points. Preferably, the shift correlation image generating unit gives weights to the pixels values of the pixels of the N shift correlation images according to the discrimination capability value registered in the model dictionary to generate N weighted shift correlation images, and the correlation sum image generating unit adds the pixel values of pixels of the N weighted shift correlation images generated by the shift correlation image generating unit to generate the correlation sum image.

In the information processing apparatus according to the above-mentioned embodiment, preferably, when at least one of the one or more the feature points of the model image registered in the model dictionary is used as a base point and one or more support points are selected from the feature points in a predetermined range of the base point, information indicating the base point and the support points is also registered in the model dictionary. Preferably, the correlation image generating unit generates mb support point correlation images between the query image and the features of mb (mb is an integer that is equal to or greater than 0) support points for the N feature points of the model image registered in the model dictionary, and shifts the positions of pixels of the mb support point correlation images corresponding to the positions of the support points and the base points in the model image to generate mb support point shift correlation images. Preferably, the correlation image generating unit adds the pixel values of the pixels of the mb support point shift correlation images and the N correlation images to generate N correlation sum images, and the shift correlation image generating unit generates the N shift correlation images from the N correlation sum images generated by the correlation image generating unit.

In the information processing apparatus according to the above-mentioned embodiment, preferably, when correlation images among the described features, the extracted model image, and one or more other model images are generated for the one or more feature points of the model image registered in the model dictionary, and discrimination capability values indicating the degree of contribution to discriminating the subject of the model image are calculated on the basis of the correlation images, the discrimination capability values are registered in the model dictionary together with information indicating the corresponding feature points. Preferably, when at least one of the one or more feature points of the model image registered in the model dictionary is used as a base point and the feature point whose discrimination capability value is higher than that of the base point is selected as a support point from the feature points in a predetermined range of the base point, information indicating the base point and the support points is also registered in the model dictionary. Preferably, the correlation image generating unit generates mb support point correlation images between the query image and the features of mb (mb is an integer that is equal to or greater than 0) support points for the N feature points of the model image registered in the model dictionary, and shifts the positions of pixels of the mb support point correlation images corresponding to the positions of the support points and the base points in the model image to generate mb support point shift correlation images. Preferably, the correlation image generating unit adds the pixel values of the pixels of the mb support point shift correlation images and the N correlation images to generate N correlation sum images. Preferably, the shift correlation image generating unit gives weights to the pixels values of the pixels of the N correlation sum images generated by the correlation image generating unit according to the discrimination capability values registered in the model dictionary to generate N weighted shift correlation images, and the correlation sum image generating unit adds the pixel values of pixels of the N weighted shift correlation images generated by the shift correlation image generating unit to generate the correlation sum image.

An information processing method and a program according to yet another embodiments of the invention correspond to the information processing apparatus according to the above-mentioned embodiment of the invention.

According to further another embodiment of the invention, there is provided an information processing method of an information processing apparatus that compares a query image and a model image and discriminates a subject of the model image from a subject of the query image. The information processing method includes the steps of: when N (N is an integer that is equal to or greater than 1) feature points are extracted from the model image and features of the extracted N feature points are described, registering information indicating the N feature points and the features thereof in a model dictionary that is provided inside or outside the information processing apparatus; generating correlation images between the query image and the corresponding features for the N feature points of the model image registered in the model dictionary; shifting the positions of pixels of the generated N correlation images corresponding to the positions of the feature points in the model image to generate N shift correlation images; adding the pixel values of pixels of the generated N shift correlation images to generate a correlation sum image; and determining whether the subject of the model image and the subject of the query image are matched with each other, on the basis of the generated correlation sum image.

As described above, according to the embodiments of the invention, it is possible to provide a discrimination capability value for recognizing an object of an image. In particular, according to the embodiments of the invention, the use of the discrimination capability value makes it possible to reliably recognize an object of an image.

Also, according to the embodiments of the invention, it is possible to recognize an object of an image. In particular, according to the embodiments of the invention, it is possible to reliably recognize an object of an image.

DESCRIPTION OF THE PREFERRED EMBODIMENTS

Before describing embodiments of the present invention, the correspondence between elements of the invention and embodiments disclosed in the specification is discussed below. This description is intended to assure that the embodiment supporting the claimed invention is described in this specification and drawings. Thus, even if there is an embodiment which is disclosed in the specification or the drawings but is not described herein as the embodiment corresponding to the elements of the invention, it does not mean that the embodiment does not relate to the element of the invention. Conversely, even if an embodiment is described herein as relating to a certain element of the invention, it does not necessarily mean that the element does not relate to elements other than the element.

Figure 6:
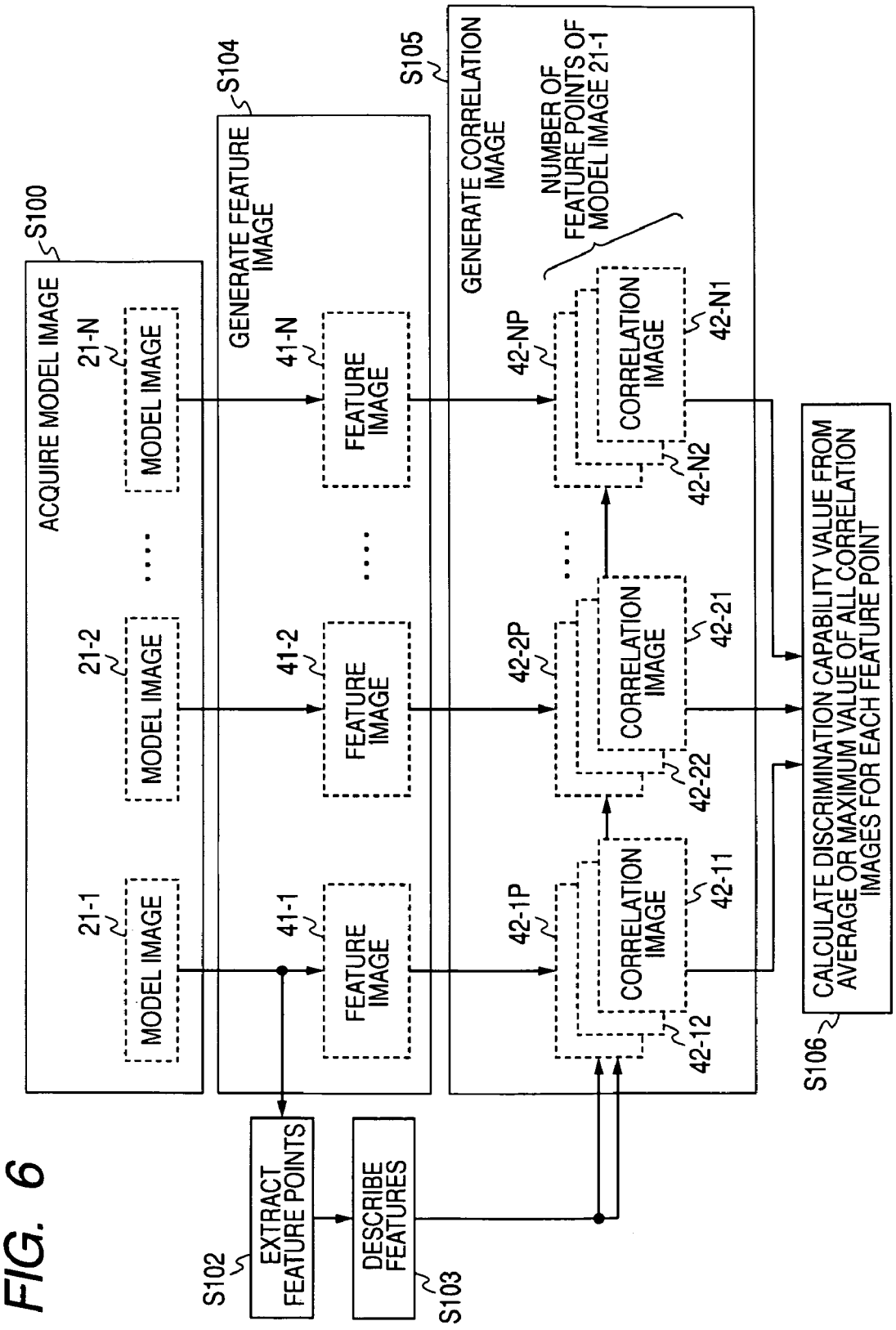
FIG. 6 is a flowchart illustrating an example of the process of a feature point discrimination capability value calculating unit shown in FIG. 2.

According to an embodiment of the invention, there is provided an information processing apparatus (for example, an object recognition apparatus of FIG. 1) that compares a query image (for example, a query image 22 of FIG. 1) and a model image (for example, model images 21-1 to 21-N of FIG. 1) and provides support information for discriminating a subject of the model image and a subject of the query image. The information processing apparatus includes: a feature point extracting unit (for example, a feature point extracting unit 31 of FIG. 2) extracting one or more feature points from the model image; a feature describing unit (for example, a feature describing unit 32 of FIG. 2) describing features of the one or more feature points extracted by the feature point extracting unit; and a discrimination capability value calculating unit (for example, a discrimination capability value calculating unit 33 of FIG. 2) generating correlation images (for example, correlation images 42-11 to 42-NP shown in FIG. 6 are generated in Step S105) among the features described by the feature describing unit (the features described in Step S103 of FIG. 6), the extracted model image, and one or more other model images for the one or more feature points extracted by the feature point extracting unit (for example, the feature points extracted in Step S102 of FIG. 6 for the model image 21-1 of FIG. 6), and calculating a discrimination capability value indicating the degree of contribution to discriminating the subject of the model image on the basis of the correlation images (for example, calculating a discrimination capability value in Step S106 of FIG. 6).

The information processing apparatus further includes a support point selecting unit (for example, a support point selecting unit 34 of FIG. 2) using at least one of the one or more feature points extracted by the feature point extracting unit as a base point, and selecting, as a support point, the feature point whose discrimination capability value, which is calculated by the discrimination capability value calculating unit, is higher than that of the base point from the feature points in a predetermined range of the base point.

An information processing method and a program according to embodiments of the invention correspond to the information processing apparatus according to the above-mentioned embodiment of the invention. The program is recorded in a recording medium, such as a removable medium 211 shown in FIG. 17 or a hard disk included in a storage unit 208, and is executed by a computer having the structure shown in FIG. 17. The program will be described in detail later.

An embodiment of the invention includes a recording medium having the program according to the above-mentioned embodiment of the invention recorded therein.

Hereinafter, exemplary embodiments of the invention will be described with reference to the accompanying drawings.

Figure 1:
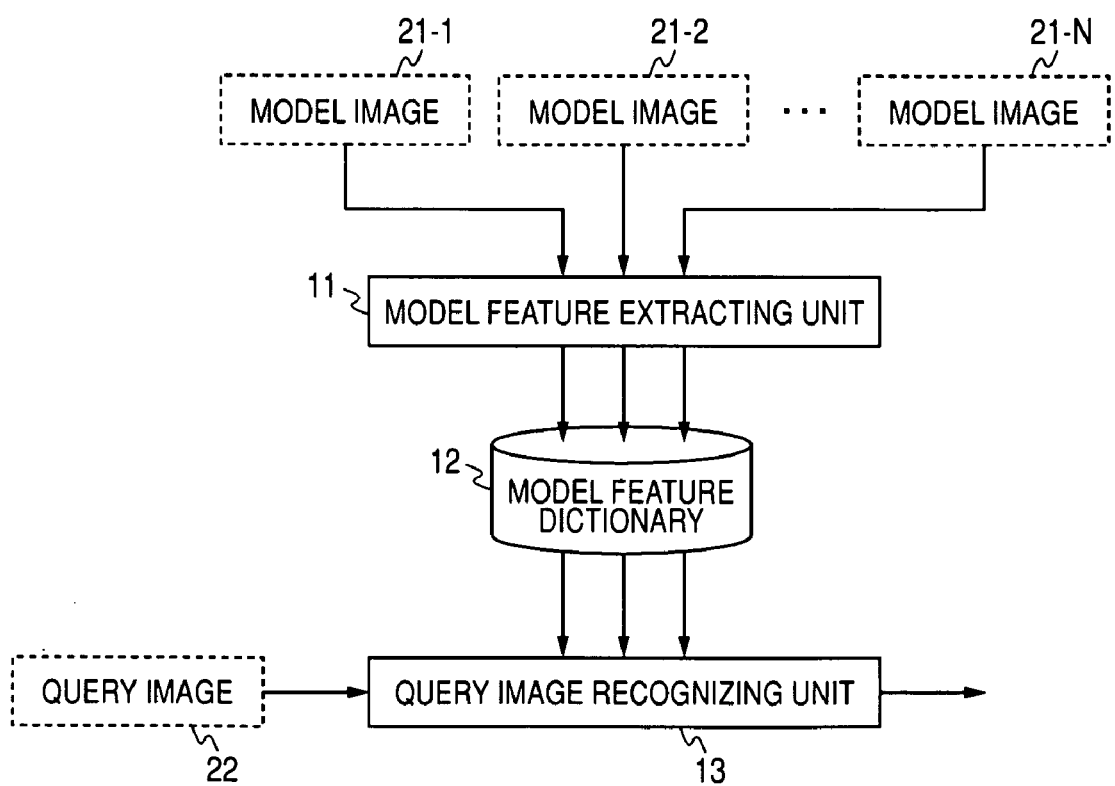
FIG. 1 is a block diagram illustrating the functional structure of an object recognition apparatus according to a first embodiment of the invention.

FIG. 1 is a block diagram illustrating the functional structure of an object recognition apparatus according to a first embodiment of the invention.

In FIG. 1, the object recognition apparatus includes a model feature extracting unit 11, a model feature dictionary 12, and a query image recognizing unit 13.

The model feature extracting unit 11 extracts model features from model images 21-1 to 21-N (N is an integer that is equal to or greater than 1) including objects to be recognized, and registers the extracted model features in the model feature dictionary 12 during an object recognizing process.

The model images 21-1 to 21-N are still pictures or frame images of moving pictures.

The query image recognizing unit 13 extracts a query feature from a query image 22 including an object to be recognized, which is compared with the object included in each of the model images 21-1 to 21-N, performs matching between the query feature and the model features registered in the model feature dictionary 12, and performs discrimination between the objects in the model images 21-1 to 21-N and the object in the query image 22 on the basis of the matching result.

The query image 22 is a still picture or a frame image of a moving picture, similar to the model images 21-1 to 21-N.

Hereinafter, the model feature extracting unit 11 and the query image recognizing unit 13 will be individually described in detail.

In the following description, when it is not necessary to discriminate the model images 21-1 to 21-N, that is, when one of the model images 21-1 to 21-N is described, the model image is just referred to as a model image 21.

Figure 2:
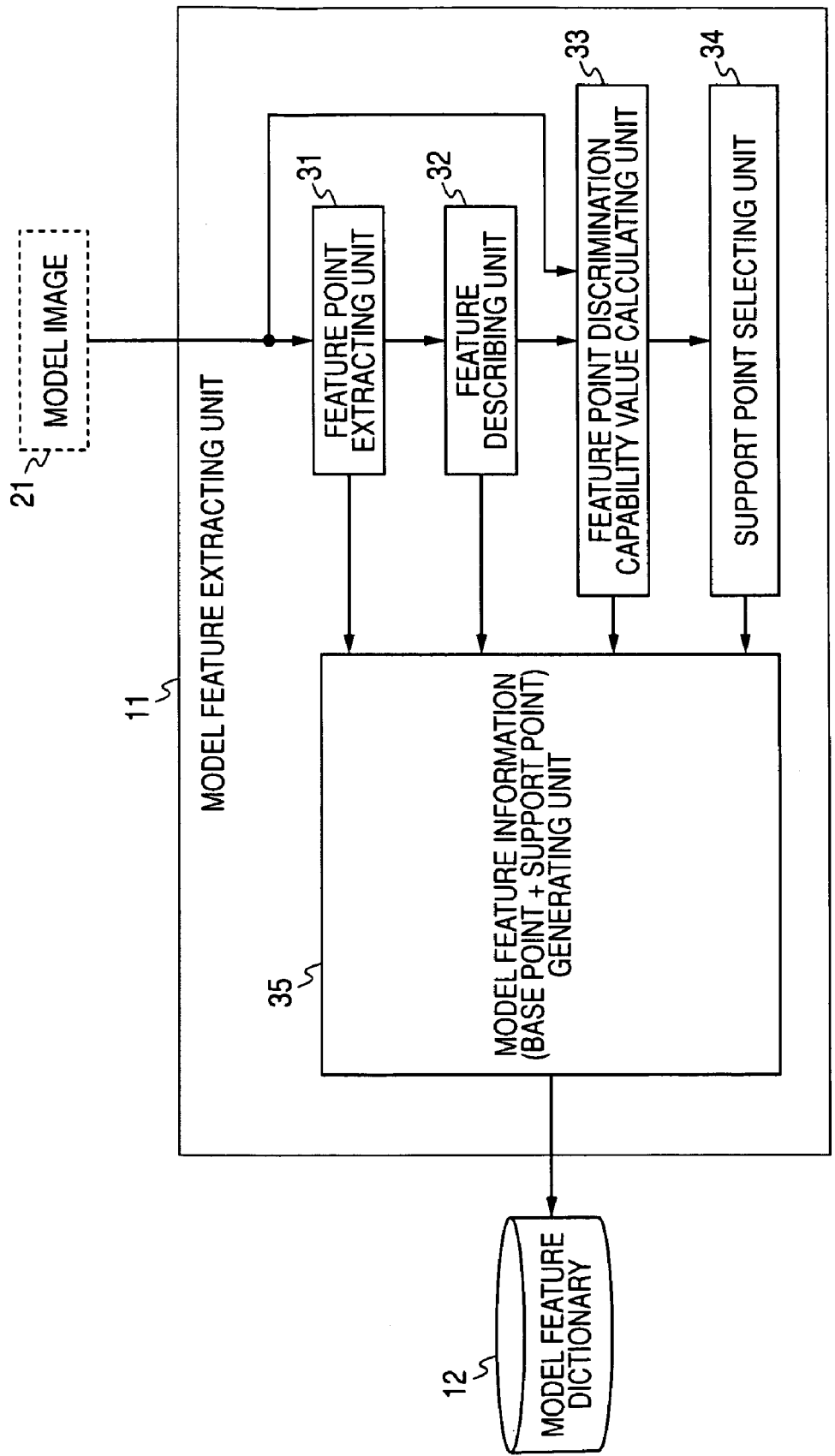
FIG. 2 is a block diagram illustrating the detailed functional structure of a model feature extracting unit shown in FIG. 1.

FIG. 2 is a block diagram illustrating the detailed functional structure of the model feature extracting unit 11.

The model feature extracting unit 11 includes a feature point extracting unit 31, a feature describing unit 32, a feature point discrimination capability value calculating unit 33, a support point selecting unit 34, and a model feature information generating unit 35.

The feature point extracting unit 31 extracts a feature point from the model image 21 and provides the extracted result to the feature describing unit 32 and the model feature information generating unit 35.

The feature point extracting method of the feature point extracting unit 31 is not particularly limited.

Figure 3:
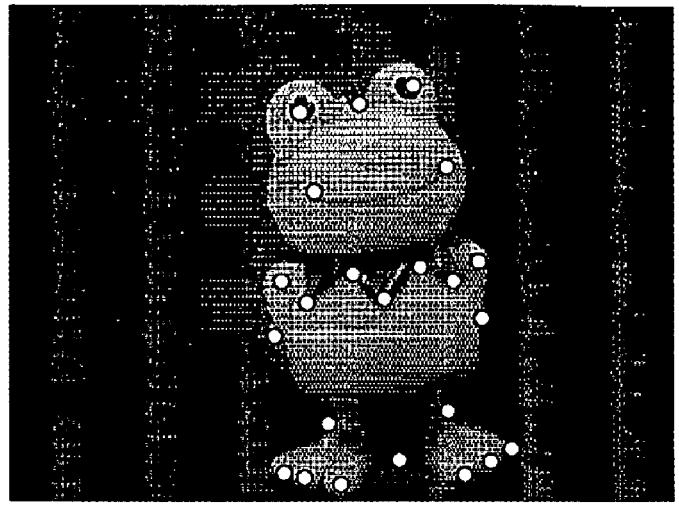
FIG. 3 is a diagram illustrating an example of the processed result of a feature point extracting unit shown in FIG. 2.

Specifically, FIG. 3 shows the extraction result of feature points when a feature point extracting method using, for example, a Harris corner detector is adopted. In FIG. 3, symbols ○ (white circles) indicate the feature points. In the extracting method, as shown in FIG. 3, corner points are extracted as the feature points.

Figure 4:
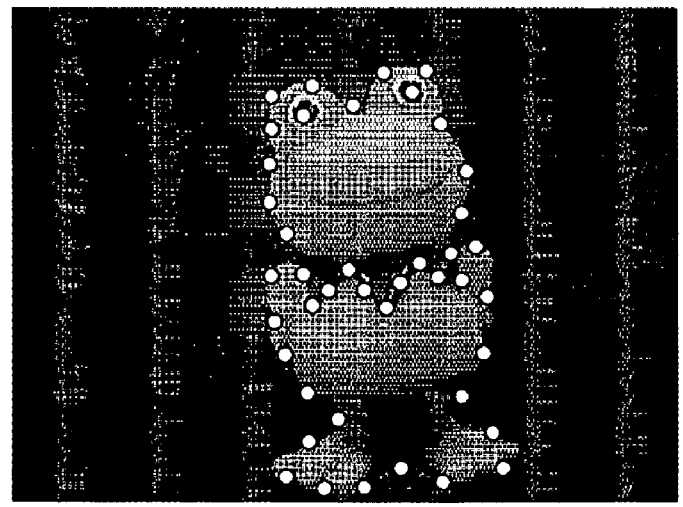
FIG. 4 is a diagram illustrating an example of the processed result of the feature point extracting unit shown in FIG. 2.

FIG. 4 shows the extraction result of feature points when a feature point extracting method using, for example, a Canny edge detector is adopted. In FIG. 4, symbols ○ (white circles) indicate the feature points. In the extracting method, as shown in FIG. 4, edge points are extracted as the feature points.

The feature describing unit 32 performs a process of describing a local feature around each of the feature points extracted by the feature point extracting unit 31, and provides the processed results to the feature point discrimination capability value calculating unit 33 and the model feature information generating unit 35.

The local feature describing method of the feature describing unit 32 is not particularly limited.

For example, a method of using the brightness gradient of pixel values to describe the vector of a local feature may be used.

Figure 5:
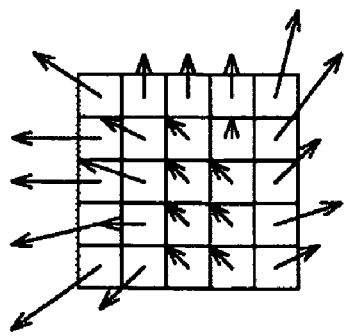
FIG. 5 is a diagram illustrating an example of the process of a feature describing unit shown in FIG. 2.

Specifically, for example, as shown in FIG. 5, when the brightness gradient of 5×5 pixels around a feature point is described as vectors, x and y components of the brightness gradient of each pixel are represented by dimensional vectors. For example, the x and y components are represented by 50-dimensional vectors (Vx(0,0), Vy(0,0), Vx(0,1), Vy(0,1), . . . , Vx(4,4), Vy(4,4)).

As another method, for example, a describing method of forming a histogram in each direction of the brightness gradient vector may be used. For example, when a histogram is formed for every ten degrees of a start gradient vector around a feature point, a 36-dimensional vector is obtained.

Further, for example, a method of using brightness information as a feature may be adopted. For example, when brightness information is described as a vector in the range of 5×5 pixels around a feature point, a 25-dimensional vector is obtained.

Furthermore, the above-mentioned methods may be combined with each other.

The feature point discrimination capability value calculating unit 33 calculates a discrimination capability value for each of the feature points extracted by the feature point extracting unit 31 (the feature points whose features are described by the feature describing unit 32), and provides the calculated results to the support point selecting unit 34 and the model feature information generating unit 35.

The discrimination capability value means the capability of the feature point to discriminate a subject (capability to discriminate a model). Specifically, when a subject included in the model image 21, that is, an object to be recognized is discriminated from another object (for example, an object included in another model image), the discrimination capability value means the degree of contribution of the feature point to the discrimination, that is, the degree of influence of the feature point on the discrimination.

FIG. 6 is a flowchart illustrating a series of processes of calculating the discrimination capability value.

In addition, a process of calculating the discrimination capability value for each of the feature points extracted from the model image 21-1 will be described with reference to FIG. 6. However, actually, the same process as will be described below is performed on each of the feature points extracted from the model images 21-2 to 21-N as well as the model image 21-1 to calculate the discrimination capability value.

In Step S100 of FIG. 6, the model feature extracting unit 11 acquires all the model images 21-1 to 21-N.

In Step S102, as described above, the feature point extracting unit 31 extracts one or more feature points from the model image 21-1. In Step S103, as described above, the feature describing unit 32 describes the feature of each of the feature points extracted from the model image 21-1.

At the same time of Steps S102 and S103, in Step S104, the feature point discrimination capability value calculating unit 33 generates feature images 41-1 to 41-N from the model images 21-1 to 21-N, respectively.

When the same local feature describing method as that used by the feature describing unit 32 is performed to describe the features of all the pixels of the model image 21-K, a feature image 41-K (K is an integer in the range of 1 to N) means an image which is formed by the description results. That is, the feature image 41-K has the features as the pixel values.

In Step S105, the feature point discrimination capability value calculating unit 33 generates correlation images for P (P is an integer that is less than or equal to the number of feature points extracted in Step S102) feature points to be subjected to a discrimination capability calculating process, among the feature points of the model image 21-1 (the feature points which have been extracted in Step S102 and whose features have been described in Step S103).

A correlation image 42-KL (K is equal to the value of K in the feature image 41-K, and L is a value in the range of 1 to P) means the following image. That is, numbers 1 to P are given to P feature points whose discrimination capabilities will be calculated. Among the feature points to be processed, an interest feature point of number L is referred to as an interest feature point L. In this case, when matching between the feature of the interest feature point L and the pixel values (that is, the features) of the feature image 41-K is performed to calculate the correlation (distance) values thereof, the correlation image 42-KL is an image having the correlation values as the pixel values. In this case, for example, the normalized correlation between vectors may be used as the correlation value, and Euclidean distance may be used as distance 0.

That is, N correlation images 42-1L, 42-2L, . . . , 42-NL indicating the correlations with N feature images 41-1, 41-2, . . . , 41-N are generated for the interest feature point L.

That is, correlation images with P feature points given numbers 1 to P, that is, P correlation images 42-K1, 42-K2, 42-KP are generated for one feature image 41-K.

In Step S106, the feature point discrimination capability value calculating unit 33 calculates the discrimination capability values from the average or maximum value of all the correlation images for each of the feature points given the numbers 1 to P. That is, the feature point discrimination capability value calculating unit 33 gives the correlation images high discrimination capability values in ascending order of the average or maximum value. All the correlation images mean all correlation images generated for the interest feature point L, that is, N correlation images 42-1L, 42-2L, ..., 42-NL.

Figure 7:
FIG. 7 is a diagram illustrating an example of the processed result shown in FIG. 6.
Figure 8:
FIG. 8 is a diagram illustrating an example of the processed result shown in FIG. 6.

For example, FIGS. 7 and 8 show images formed by the discrimination capability values. In FIGS. 7 and 8, the larger the discrimination capability value of the feature point becomes, the brighter (white) the image becomes. That is, FIG. 7 shows an example of the discrimination capability value when an image including a frog-shaped object (hereinafter, referred to as a frog) is the model image 21-1. As shown in FIG. 7, the discrimination capability value is high in the vicinity of the eye of the frog. That is, the eye is an important part for identifying the frog. FIG. 8 shows an example of the discrimination capability value when an image including a dog-shaped object (hereinafter, referred to as a dog) is the model image 21-1. As shown in FIG. 8, the discrimination capability value is high in the vicinity of the tail of the dog. That is, the tail is an important part for identifying the dog.

Although not shown in the drawings, after Step S106 in FIG. 6, the feature point discrimination capability value calculating unit 33 arranges, for example, the numbers of the P feature points in descending order of the discrimination capability value. That is, after the process, the numbers of the P feature points indicate priority to model discrimination.

Returning to FIG. 2, the support point selecting unit 34 uses the discrimination capability values calculated by the feature point discrimination capability value calculating unit 33 to select a support point.

The support point means the following point. That is, a reference point selected from the feature points extracted by the feature point extracting unit 31 is referred to as a base point. In this case, among the feature points other than the base point, a point that is dependently determined by the base point is referred to as the support point.

Figure 9:
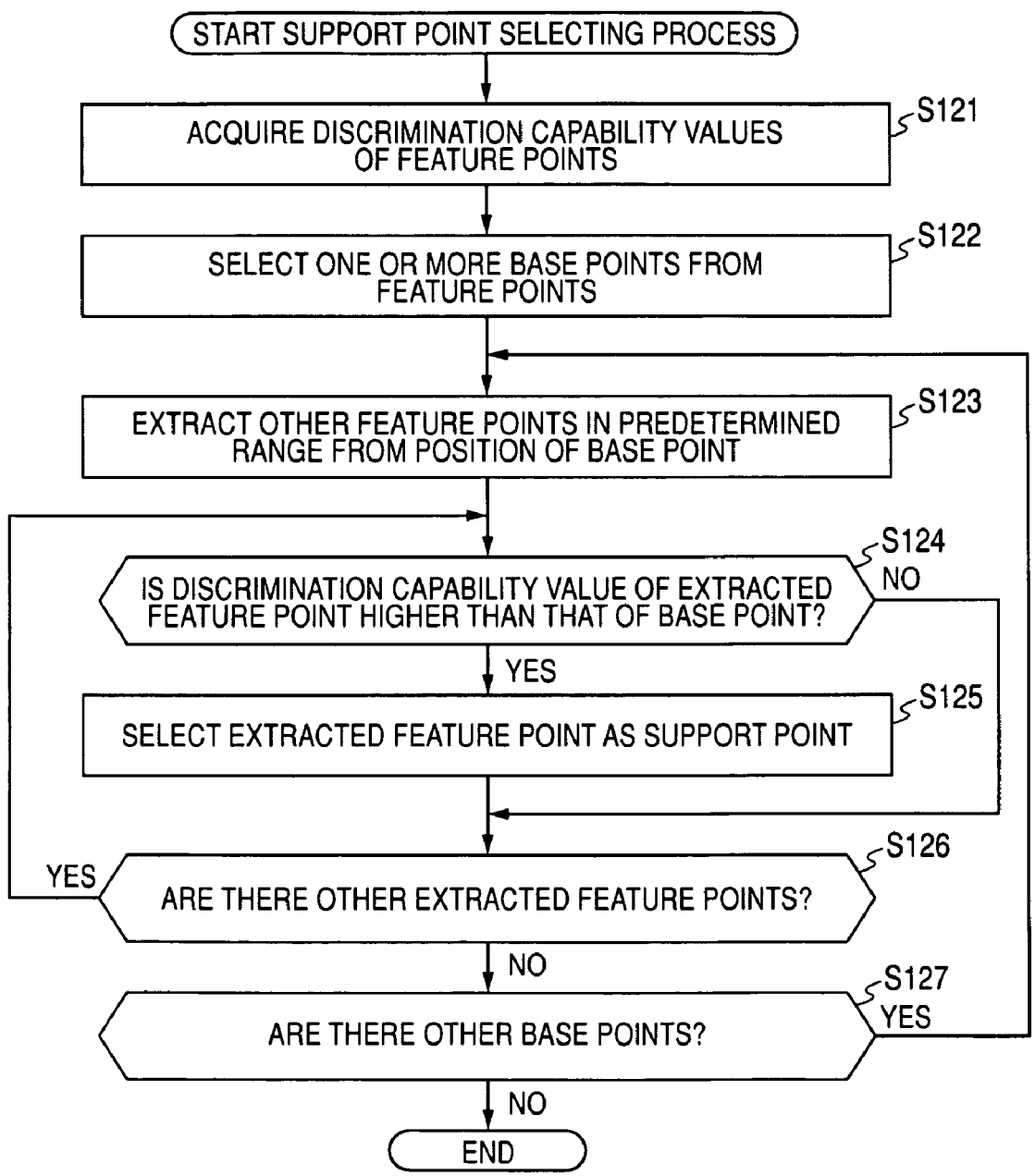
FIG. 9 is a flowchart illustrating an example of a support point selecting process of a support point selecting unit shown in FIG. 2.

A method of determining the support point is not particularly limited. For example, in this embodiment, among the feature points in a predetermined range from the position of the base point in the model image 21, a feature point having a discrimination capability value that is higher than that of the base point is selected as the support point. When this determining method is used, a plurality of support points may be selected for one base point. FIG. 9 is a flowchart illustrating an example of the process of the support point selecting unit 34 (hereinafter, referred to as a support point selecting process) in the determining method.

In Step S121 of FIG. 9, the support point selecting unit 34 acquires the discrimination capability value of each of the P feature points of the model image 21.

In Step S122, the support point selecting unit 34 selects one or more base points from the P feature points. The selecting method of the base point is not particularly limited.

In Step S123, the support point selecting unit 34 selects a predetermined point among the one or more base points as a process target, and extracts the other feature points in a predetermined range from the position of the target base point.

In Step S124, the support point selecting unit 34 determines whether the discrimination capability values of the extracted feature points are higher than that of the base point.

In Step S123, no feature point maybe extracted. In this case, it is forcibly determined in Step S124 that the discrimination capability values of the extracted feature points are lower than that of the base point, and the process proceeds to Step S126. The process after Step S126 will be described below.

On the other hand, a plurality of feature points may be extracted in Step S123. In this case, a predetermined one of the plurality of feature points is a process target in Step S124, and it is determined whether the discrimination capability value of the target feature point is higher than that of the base point.

When it is determined in Step S124 that the discrimination capability value of the extracted feature point is higher than that of the base point, the support point selecting unit 34 selects the extracted feature point (when a plurality of feature points are extracted, the target feature point) as the support point in Step S125. Then, the process proceeds to Step S126.

On the other hand, when it is determined in Step S124 that the discrimination capability value of the extracted feature point is lower than that of the base point, the process proceeds to Step S126 without performing Step S125, that is, without selecting the extracted feature point (when a plurality of feature points are extracted, the target feature point) as the support point.

In Step S126, the support point selecting unit 34 determines whether there are other extracted feature points.

That is, as described above, when a plurality of feature points are extracted in Step S123, it is determined in Step S126 that the processed result is YES, and the process returns to Step S124. Then, the subsequent Steps are repeatedly performed. That is, a loop process of Steps S124, S125, and S126 is repeatedly performed to sequentially process a plurality of feature points. As a result, among the plurality of feature points, only the feature points having a discrimination capability value that is higher than that of the base point are selected as the support points. When the loop process is performed on all the plurality of feature points, it is determined in Step S126 of the final loop process that the result is NO, and the process proceeds to Step S127.

When only one feature point or no feature point is extracted in Step S123, it is determined in Step S126 that the result is NO, and the process proceeds to Step S127.

In Step S127, the support point selecting unit 34 determines whether there are other base points.

When base points to be processed remain, it is determined in Step S127 that the result is YES, and the process returns to Step S123. Then, the subsequent Steps are repeatedly performed.

In this way, when one or more support points are selected for one or more base points, it is determined in Step S127 that the result is NO, and the support point selecting process ends.

Figure 10:
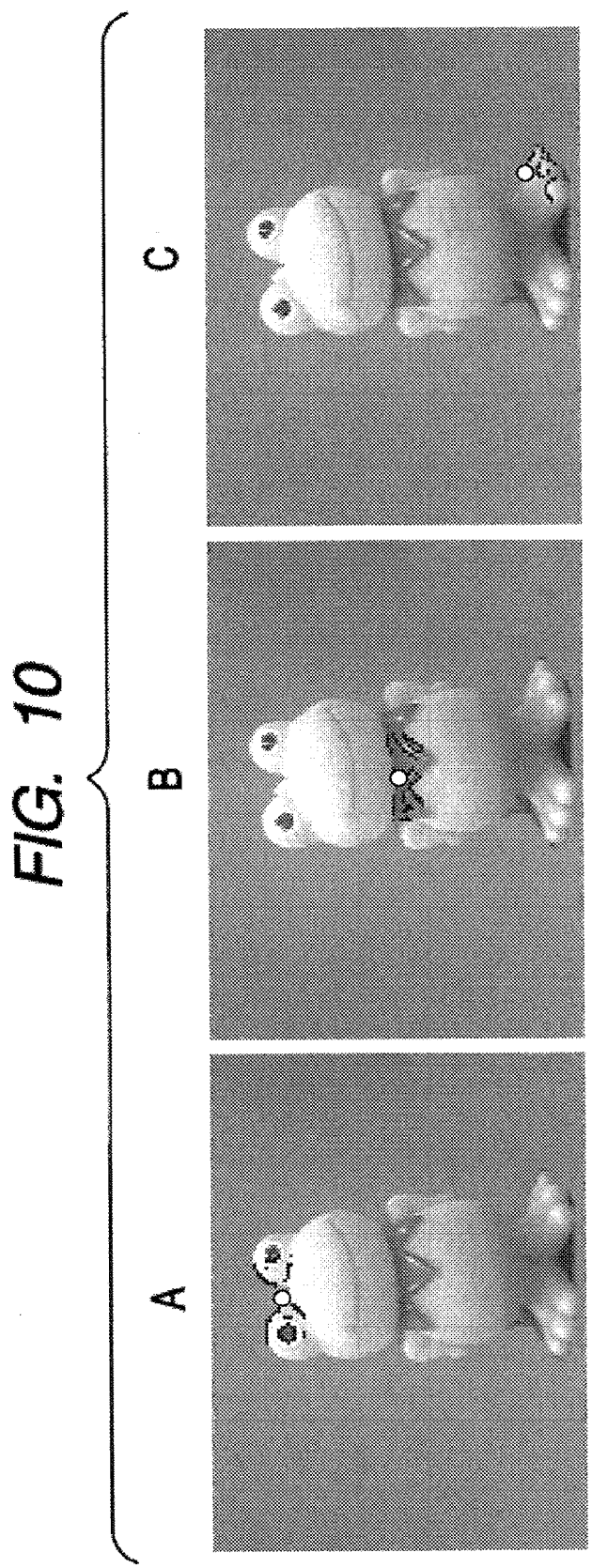
FIG. 10 shows diagrams illustrating an example of the processed result shown in FIG. 9.

Specifically, for example, FIG. 10 shows the selection results of the base points and the support points. That is, three base points are selected from the same model image 21, and the base points are represented by symbols ○ (white circles) in FIG. 10. A plurality of support points selected for the three base points are represented by symbols ■ (black squares) having a diameter that is smaller than that of the symbols ○ (white circles) indicating the base points in FIG. 10.

Returning to FIG. 2, the model feature information generating unit 35 generates model feature information (base point+support point) indicating the processed results of the feature point extracting unit 31 to the support point selecting unit 34, and registers the information in the model feature dictionary 12. That is, the model feature information is related to the feature points extracted from the model images 21-1 to 21-N. Specifically, for example, the feature points are discriminated from the base points and the support points, and information including the local feature and the discrimination capability value of each of the feature points, and support point information are the model feature information.

The detailed structure of the model feature extracting unit 11 of the object recognition apparatus shown in FIG. 1 has been described above. Next, the detailed structure of the query image recognizing unit 13 will be described.

Figure 11:
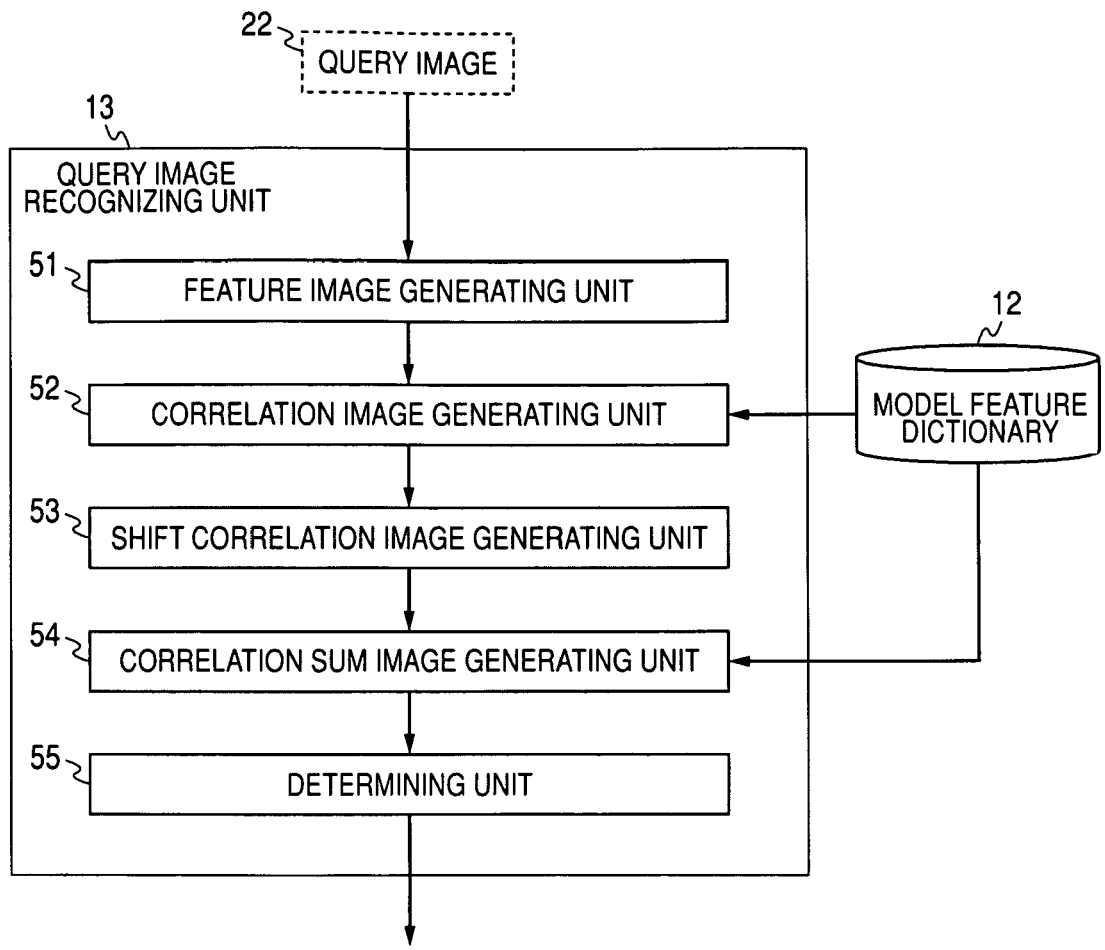
FIG. 11 is a block diagram illustrating the detailed function structure of a query image recognizing unit shown in FIG. 1.

FIG. 11 is a block diagram illustrating the detailed functional structure of the query image recognizing unit 13.

The query image recognizing unit 13 includes a feature image generating unit 51, a correlation image generating unit 52, a shift correlation image generating unit 53, a correlation sum image generating unit 54, and a determining unit 55.

When a query image 22 including an object to be recognized is input, the feature image generating unit 51 generates a feature image from the query image 22. That is, the same process as that in Step S104 of FIG. 6 is performed on the query image 22.

The correlation image generating unit 52 performs matching between the pixel values (that is, the features of the pixels) of the feature image of the query image 22 and the features of the feature points of the model images 21-1 to 21-N (hereinafter, referred to as model feature points) registered in the model feature dictionary 12 to generate images each having correlation (distance) values as the pixel values, that is, correlation images.

The shift correlation image generating unit 53 generates an image (hereinafter, referred to as a shift correlation image) obtained by shifting the positions of the pixels of the correlation image corresponding to the positions of the model feature points. A method of generating the shift correlation image will be described below with reference to FIGS. 12 to 16.

The correlation sum image generating unit 54 generates an image (hereinafter, referred to as a correlation sum image) obtained by combining the shift correlation images of the model feature points of the model images 21-1 to 21-N, or the images subjected to various types of image processing. That is, the correlation sum image means an image having the total sum of the pixel values of two or more images as the pixel values.

A method of generating the correlation sum image (including various types of image processing performed on the shift correlation image) will be described in detail below with reference to FIGS. 12 to 16.

The determining unit 55 determines whether the objects included in the model images 21-1 to 21-N are identical to the object included in the query image 22 on the basis of the correlation sum images generated for the model images 21-1 to 21-N, and outputs the determination result.

That is, among the correlation sum images for a predetermined model image 21-K, the pixel value at the shift position (in the following example, a central position) during the generation of the shift correlation image is the local peak of the correlation sum image. The local peak indicates the presence ratio of the object included in the model image 21-K in the query image 22. Therefore, if the local peak of the correlation sum image of the model image 21-K is larger than or equal to a threshold value, the determining unit 55 determines that the object included in the model image 21-K is identical to the object included in the query image 22. That is, the object can be recognized.

Next, the operations of the correlation image generating unit 52 to the correlation sum image generating unit 54 of the query image recognizing unit 13 will be mainly described with reference to FIGS. 12 to 16.

Figure 12:
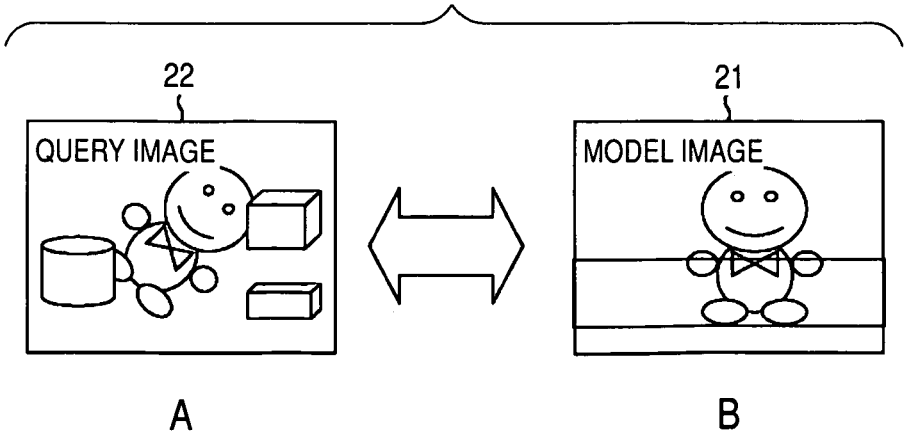
FIG. 12 shows diagrams illustrating examples of a model image and a query image for describing the process of the query image recognizing unit shown in FIG. 11.

That is, FIGS. 13 to 16 show various process results until a correlation sum image with the model image 21 shown in B in FIG. 12 is generated when the image shown in A and FIG. 12 is input as the query image 22.

Figure 13:
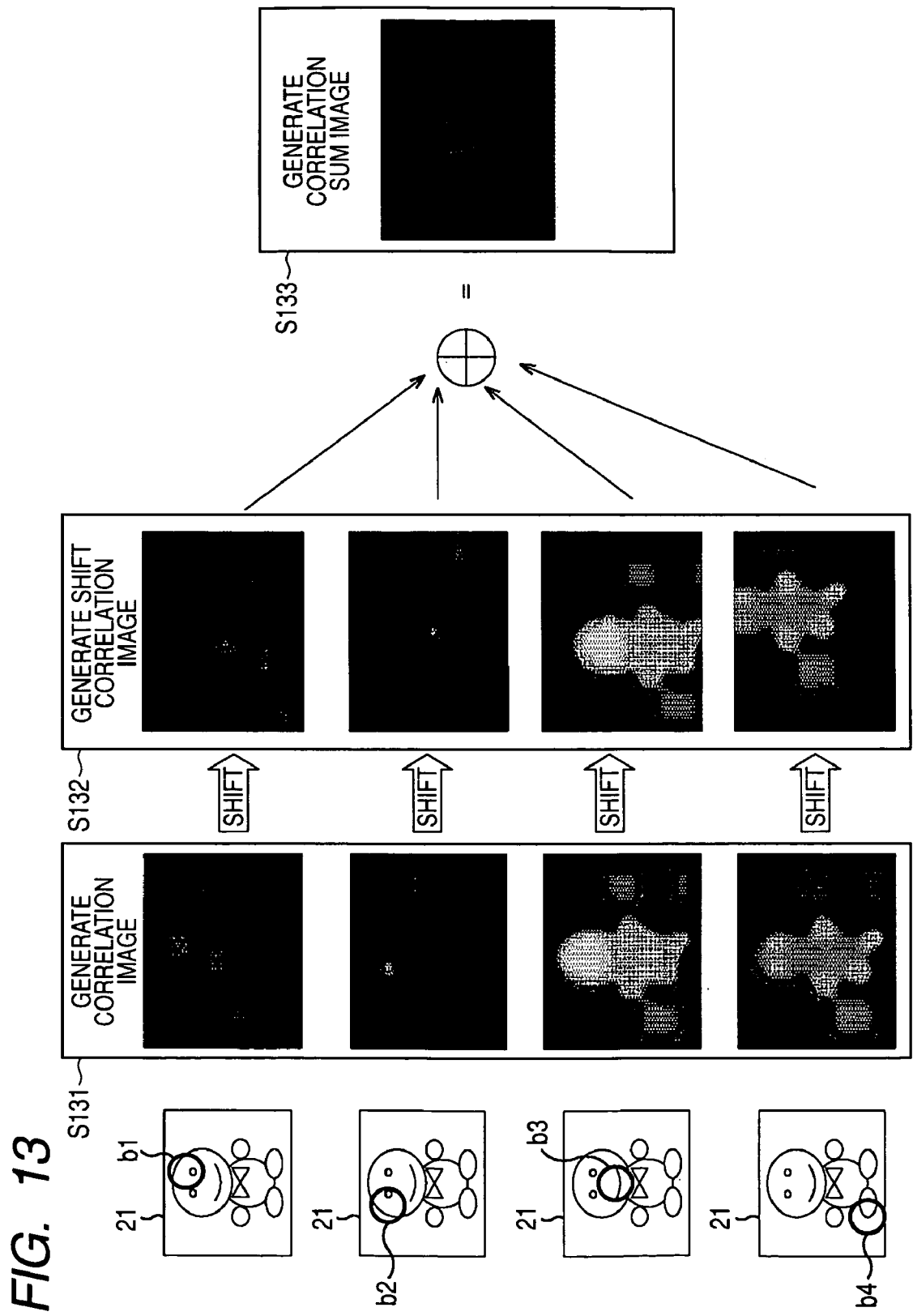
FIG. 13 is a diagram illustrating an example of the processed result of the query image recognizing unit shown in FIG. 11.

In the example shown in FIG. 13, only the features of four base points b1 to b4 are used as the feature information of the model image 21 to generate a correlation sum image. That is, in the example shown in FIG. 13, as in another example which will be described below, the information of the support point or the discrimination capability value is not used. The base points b1 to b4 are just illustrative, but the numbers of base points or the positions thereof are not limited to the example shown in FIG. 13.

In Step S131 of FIG. 13, the correlation image generating unit 52 performs matching between the pixel values (that is, the features of the pixels) of the feature image of the query image 22 and the features of the base points b1 to b4 of the model image 21 to generate four correlation images shown in a frame S131 of FIG. 13.

In Step S132, the shift correlation image generating unit 53 shifts the positions of the pixels of the correlation image corresponding to the positions of the base points b1 to b4 to generate four shift correlation images shown in a frame S132 of FIG. 13.

The shift correlation image shown in FIG. 13 is obtained by shifting the positions of the pixels of the correlation image such that the position (the position of a corresponding pixel of the correlation image) of a base point bn (n is an integer in the range of 1 to 4 in the example shown in FIG. 13) of the model image 21 is shifted to the central position of the image.

In Step S133, the correlation sum image generating unit 54 simply combines the four shift correlation images to generate a correlation sum image shown in a frame S133 of FIG. 13. The term "combining" means to sum the pixel values of the pixels. This is similarly applied to the following description.

Figure 14:
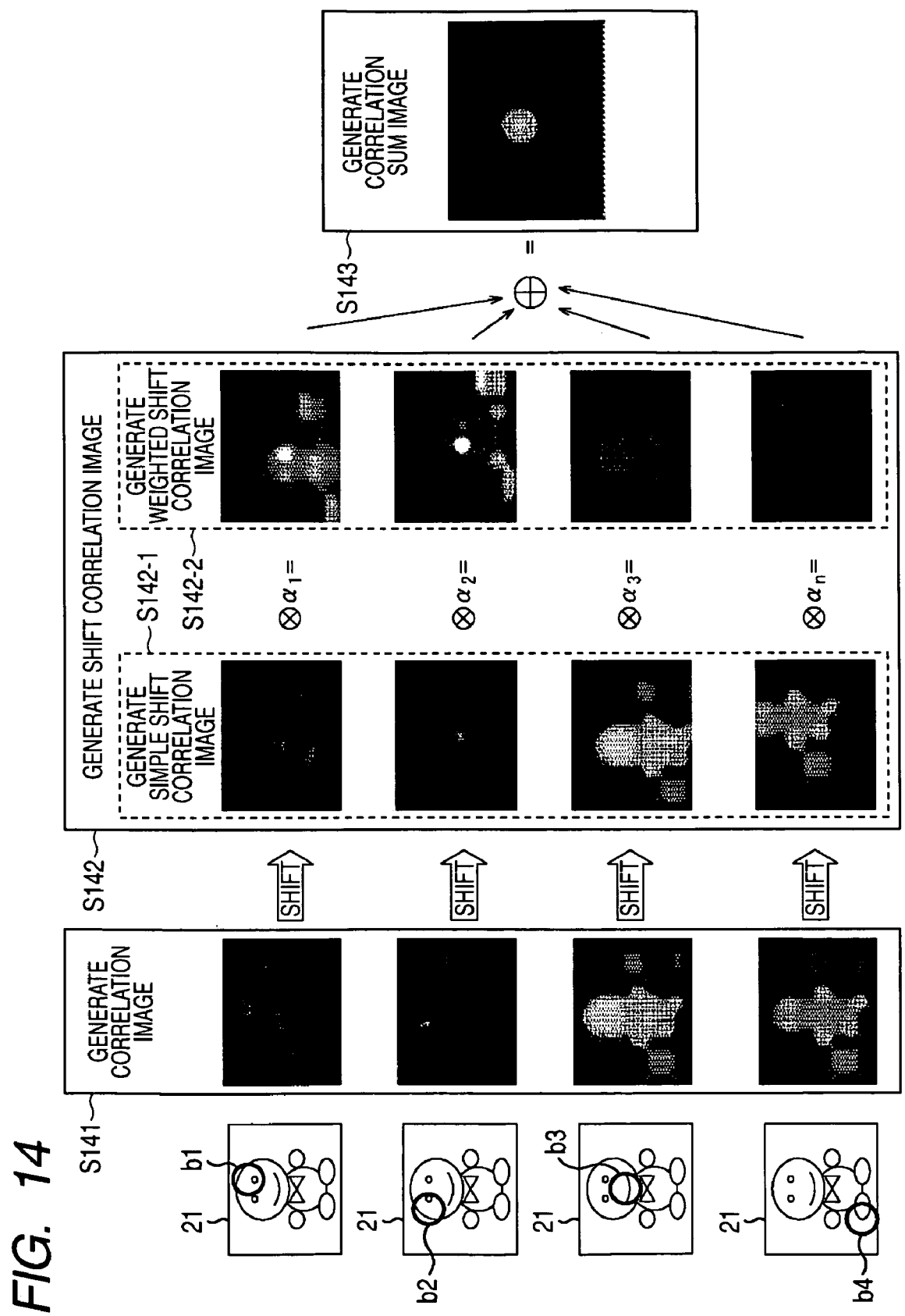
FIG. 14 is a diagram illustrating an example of the processed result of the query image recognizing unit shown in FIG. 11.

Unlike the example shown in FIG. 13, in the example shown in FIG. 14, in addition to the features of the four base points b1 to b4, weight values $\alpha 1$ to $\alpha 4$ based on the discrimination capability values thereof are used as the feature information of the model image 21 to generate the correlation sum image.

That is, in Step S141, the correlation image generating unit 52 performs matching between the pixel values (that is, the features of the pixels) of the feature image of the query image 22 and the features of the base points b1 to b4 of the model image 21 to generate four correlation images shown in a frame S141 of FIG. 14.

The four correlation images in the frame S141 shown in FIG. 14 are the same as those in the frame S131 shown in FIG. 13. That is, the same process is performed in Step S141 and Step S131.

In Step S142, a process of generating a shift correlation image is performed. However, Step S142 differs from Step S132 shown in FIG. 13.

That is, in Step S142-1, the shift correlation image generating unit 53 shifts the positions of the pixels of the correlation images corresponding to the positions of the base points b1 to b4 to generate four shift correlation images in a frame S142-1 represented by a dotted line in FIG. 14.

The four correlation images shown in the dotted frame S142-1 of FIG. 14 are the same as those shown in the frame S132 of FIG. 13. That is, the same process is performed in Step S142-1 and Step S132 shown in FIG. 13.

In other words, in Step S142, Step S142-2 is performed in addition to Step S132 (=Step S142-1) shown in FIG. 13. In order to discriminate the shift correlation image that is finally obtained in Step S142-2 from the shift correlation image obtained in Step S142-1, the former is referred to as a weighted shift correlation image, and the latter is referred to as a simple shift correlation image.

That is, in Step S142-1, four simple shift correlation images shown in the dotted frame S142-1 of FIG. 14 are generated. In Step S142-2, the shift correlation image generating unit 53 multiplies the pixel values of the simple shift correlation images corresponding to the base points b1 to b4 by the weight values $\alpha 1$ to $\alpha 4$ based on the discrimination capability values of the base points b1 to b4 to generate images formed by the pixel values multiplied by the weights based on the discrimination capability values, that is, four weighted shift correlation images shown in the dotted frame S142-2 of FIG. 14.

In Step S143, the correlation sum image generating unit 54 simply combines the four weighted shift correlation images to generate a correlation sum image shown in a frame S143 of FIG. 14.

Figure 15:
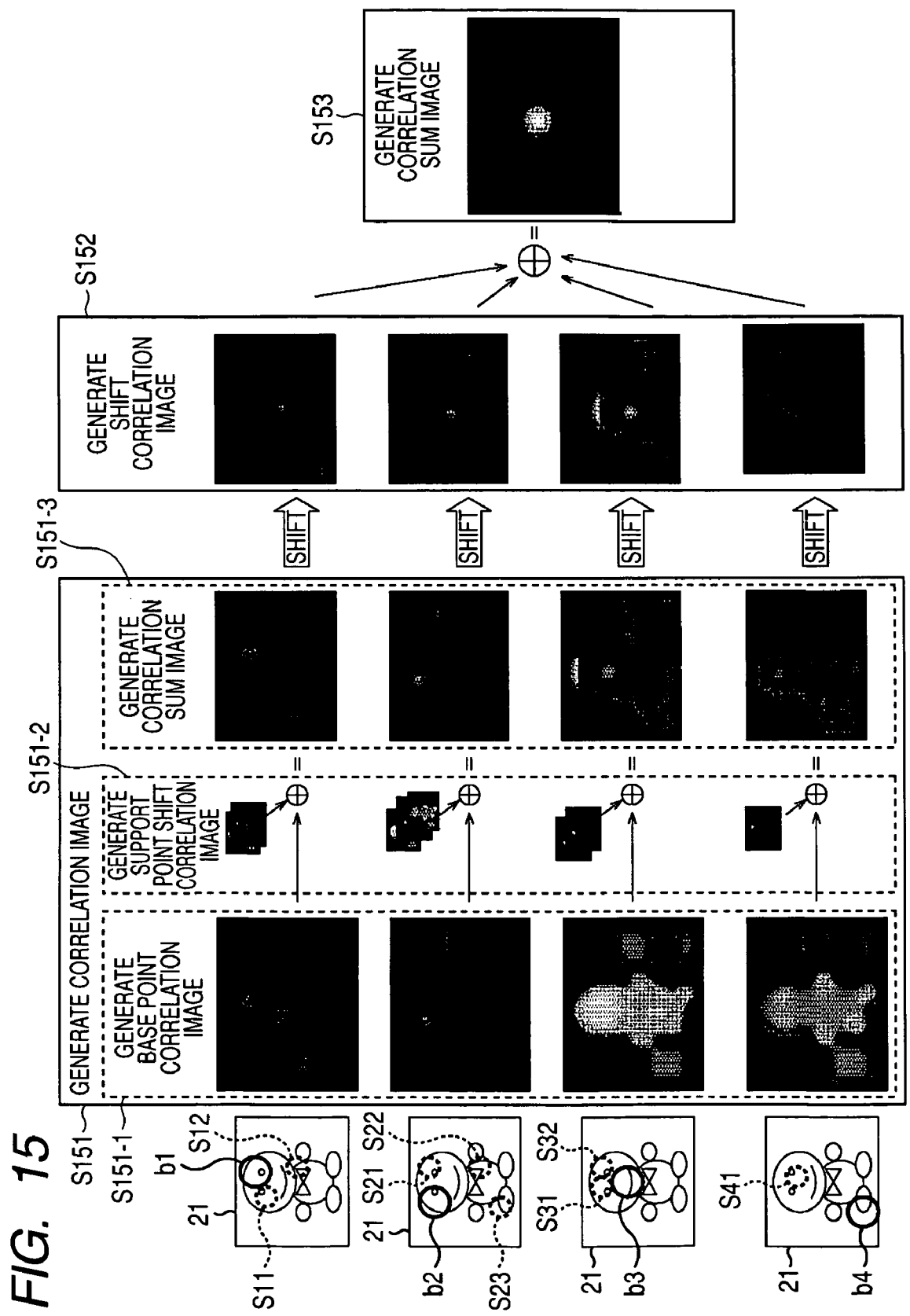
FIG. 15 is a diagram illustrating an example of the processed result of the query image recognizing unit shown in FIG. 11.

Unlike the examples shown in FIGS. 13 and 14, in the example shown in FIG. 15, in addition to the features of the four base points b1 to b4, information of the support points of the base points b1 to b4 is used as the feature information of the model image 21 to generate the correlation sum image. However, in the example shown in FIG. 15, the weight values $\alpha 1$ to $\alpha 4$ based on the discrimination capability values are not used, unlike the example shown in FIG. 14.

In Step S151, a process of generating a correlation image is performed. However, Step S151 differs from Step S131 shown in FIG. 13 or Step S141 shown in FIG. 14.

That is, in Step S152-1, the correlation image generating unit 52 performs matching between the pixel values (that is, the features of the pixels) of the feature image of the query image 22 and the features of the base points b1 to b4 of the model image 21 to generate four correlation images shown in a frame S151-1 of FIG. 15.

The four correlation images shown in the frame S151-1 of FIG. 15 are the same as those shown in the frame S131 of FIG. 13, that is, the four correlation images shown in the frame S141 of FIG. 14. That is, the same process is performed in Step S151-1, Step S131 shown in FIG. 13, and Step S141 shown in FIG. 14.

That is, in Step S151, the following Steps S151-2 and S151-3 are performed in addition to Step S131 shown in FIG. 13 (=Step S141 shown in FIG. 14=Step S151-1 shown in FIG. 15). In order to discriminate the correlation images obtained in Steps S151-1 to S151-3, the correlation image obtained in Step S151-1 is referred to as a base point correlation image, the correlation image obtained in Step S151-2 is referred to as a support point shift correlation image, and the correlation image obtained in Step S151-3 is referred to as a support point shift correlation sum image having the base point bn as its center.

That is, in Step S151-1, four base point correlation images are generated in the frame S151-1 represented by a dotted line in FIG. 15.

In Step S151-2, the correlation image generating unit 52 performs matching between the pixel values (that is, the features of the pixels) of the feature image of the query image 22 and the features of support points snm (m is an integer that is greater than or equal to 1) at the base point bn of the model image 21 to generate m correlation images. In addition, the correlation image generating unit 52 shifts the positions (the positions of the corresponding pixels of the correlation image) of the support points snm to the positions (the position of the corresponding pixels of the correlation image) of the base points bn to generate m support point shift correlation images shown in a frame S151-2 of FIG. 15 for the base points b1 to b4.

That is, two support points s11 and s12 exist at the base point b1. Therefore, a support point shift correlation image for the support point s11 and a support point shift correlation image for the support point s12 are generated.

Similarly, three support points s21, s22, and s23 exist at the base point b2. Therefore, a support point shift correlation image for the support point s21, a support point shift correlation image for the support point s22, and a support point shift correlation image for the support point s23 are generated.

Similarly, two support points s31 and s32 exist at the base point b3. Therefore, a support point shift correlation image for the support point s31 and a support point shift correlation image for the support point s32 are generated.

One support point s41 exists at the base point b4. Therefore, a support point shift correlation image for the support point s41 is generated.

In Step S151-3, the correlation image generating unit 52 simply combines a corresponding base point correlation image (the image obtained in Step S151-1) with the corresponding m support point shift correlation images (the images obtained in Step S151-2) for the base point bn of the model image 21 to generate a support point shift correlation sum image having the base point bn as its center, which is shown in a frame S151-3 of FIG. 15.

That is, a base point correlation image for the base point b1, a support point shift correlation image for the support point s11, and a support point shift correlation image for the support point s12 are combined with each other for the base point b1 to generate a support point shift correlation sum image having the base point b1 as its center.

Similarly, a base point correlation image for the base point b2, a support point shift correlation image for the support point s21, a support point shift correlation image for the support point s22, and a support point shift correlation image for the support point s23 are combined with each other for the base point b2 to generate a support point shift correlation sum image having the base point b2 as its center.

Similarly, a base point correlation image for the base point b3, a support point shift correlation image for the support point s31, and a support point shift correlation image for the support point s32 are combined with each other for the base point b3 to generate a support point shift correlation sum image having the base point b3 as its center.

A base point correlation image for the base point b4 and a support point shift correlation image for the support point s41 are combined with each other for the base point b4 to generate a support point shift correlation sum image having the base point b4 as its center.

The subsequent Steps S152 and S153 are basically the same as Steps S132 and S133 shown in FIG. 13. The process target in Step S132 of FIG. 13 is the base point correlation image obtained in Step S151-1 of FIG. 15. However, the process target in Step S152 of FIG. 15 is an image obtained by combining the base point correlation image obtained in Step S151-1 of FIG. 15 with the support point shift correlation image obtained in Step S151-2, that is, a support point shift correlation sum image having the base point as its center.

Figure 16:
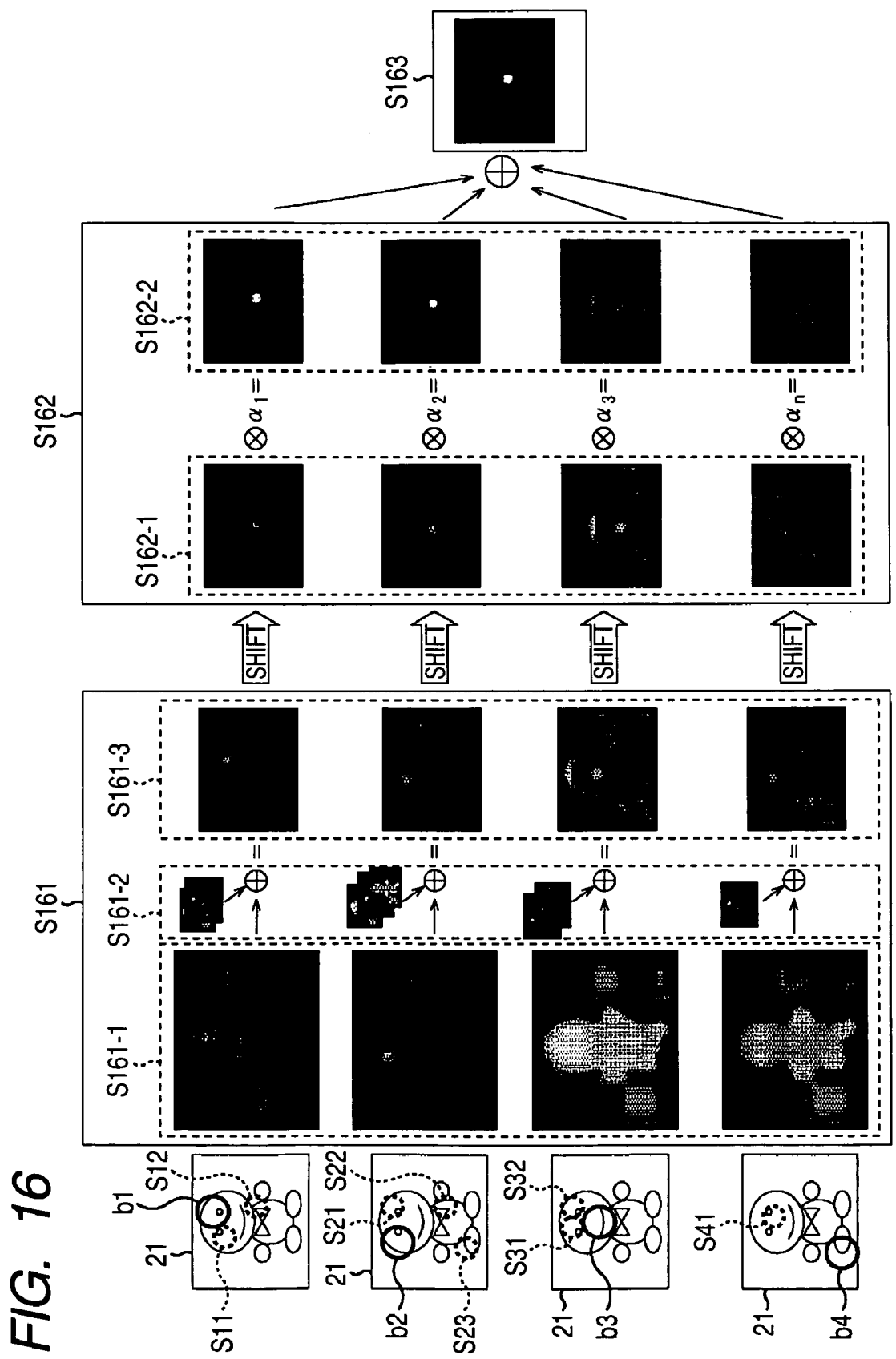
FIG. 16 is a diagram illustrating an example of the processed result of the query image recognizing unit shown in FIG. 11.

The example shown in FIG. 16 is a combination of the example shown in FIG. 14 and the example shown in FIG. 15. That is, in the example shown in FIG. 16, in addition to the features of the four base points b1 to b4, both the weight values $\alpha 1$ to $\alpha 4$ based on the discrimination capability values of the base points b1 to b4 and information of the support points of the base points b1 to b4 are used as the feature information of the model image 21 to generate a correlation sum image.

That is, the same process is performed in Step S161 shown in FIG. 16 and Step S151 shown in FIG. 15. In other words, Steps S161-1 to S161-3 shown in FIG. 16 are the same as Steps S151-1 to S151-3 shown in FIG. 15.

The same process is performed in Step S162 shown in FIG. 16 and Step S142 shown in FIG. 14. That is, Steps S162-1 and S162-2 shown in FIG. 16 are the same as Steps S141-1 and S141-2 shown in FIG. 14.

Processing results in Step S161 of FIG. 16 is represented by Expression (1) given below.

$$SumSpCor_{b_n}(x, y) = \sum_{m=1}^{m_{b_n}} Cor_{sn_m}(bx_n - snx_m + x, by_n - sny_m + y) \quad (1)$$

In Expression (1), $SumSpCor_{b_n}(x, y)$ on the left side indicates a pixel value at the coordinates (x, y) of the support point shift correlation sum image having the base point bn as its center. In addition, n is a value in the range of 1 to 4 in the example shown in FIG. 16. However, n may be an arbitrary integer.

On the right side of Expression (1), $Cor_{sn_m}(x, y)$ indicates a pixel value at the coordinates (x, y) of the correlation image of the support point snm, and $m_{b_n}$ indicates the number of support points at the base point bn. That is, in the example shown in FIG. 16, $m_{b1}$ is 2, $m_{b2}$ is 3, $m_{b3}$ is 2, and $m_{b4}$ is 1. $(bx_n, by_n)$ indicates the coordinates of the base point bn. $(snx_m, sny_m)$ indicates the coordinates of the support point snm.

The final result obtained in Step S163 of FIG. 16 is represented by Expression (2) given below.

$$SumCor(x, y) = \sum_{k=1}^{N} \alpha_k SumSpCor_{b_k}(cx - bx_k + x, cy - by_k + y) \quad (2)$$

That is, on the right side of Expression (2), the result processed in Step S162 of FIG. 16 is represented in a mathematical symbol Σ.

In Expression (2), SumCor(x, y) on the left side indicates a pixel value at the coordinates (x, y) of the correlation sum image obtained in Step S163.

On the right side of Expression (2), (cx, cy) indicates the center coordinates of the model image 21.

As described above, according to the embodiment of the invention, it is possible to perform robust recognition without considering repeatability in extracting the feature points of the query image and the model image.

Since a predetermined pixel value of the correlation sum image (for example, a pixel value in the vicinity of the center), that is, the total sum of the correlation values indicates the degree of presence of an object, it is possible to know the probability of the object existing an image by comparing the values.

Further, it is possible to calculate the discrimination capability value of a feature considering another portion of a model image, or correlation with another model image, and to select a support point on the basis of the calculated discrimination capability value. Therefore, it is possible to improve the accuracy of matching.

The above-mentioned processes may be executed by hardware or software. When the processes are executed by software, a program of the software is installed from a program recording medium to a computer that is incorporated into dedicated hardware, or a general-purpose personal computer that installs various programs to execute various functions.

Figure 17:
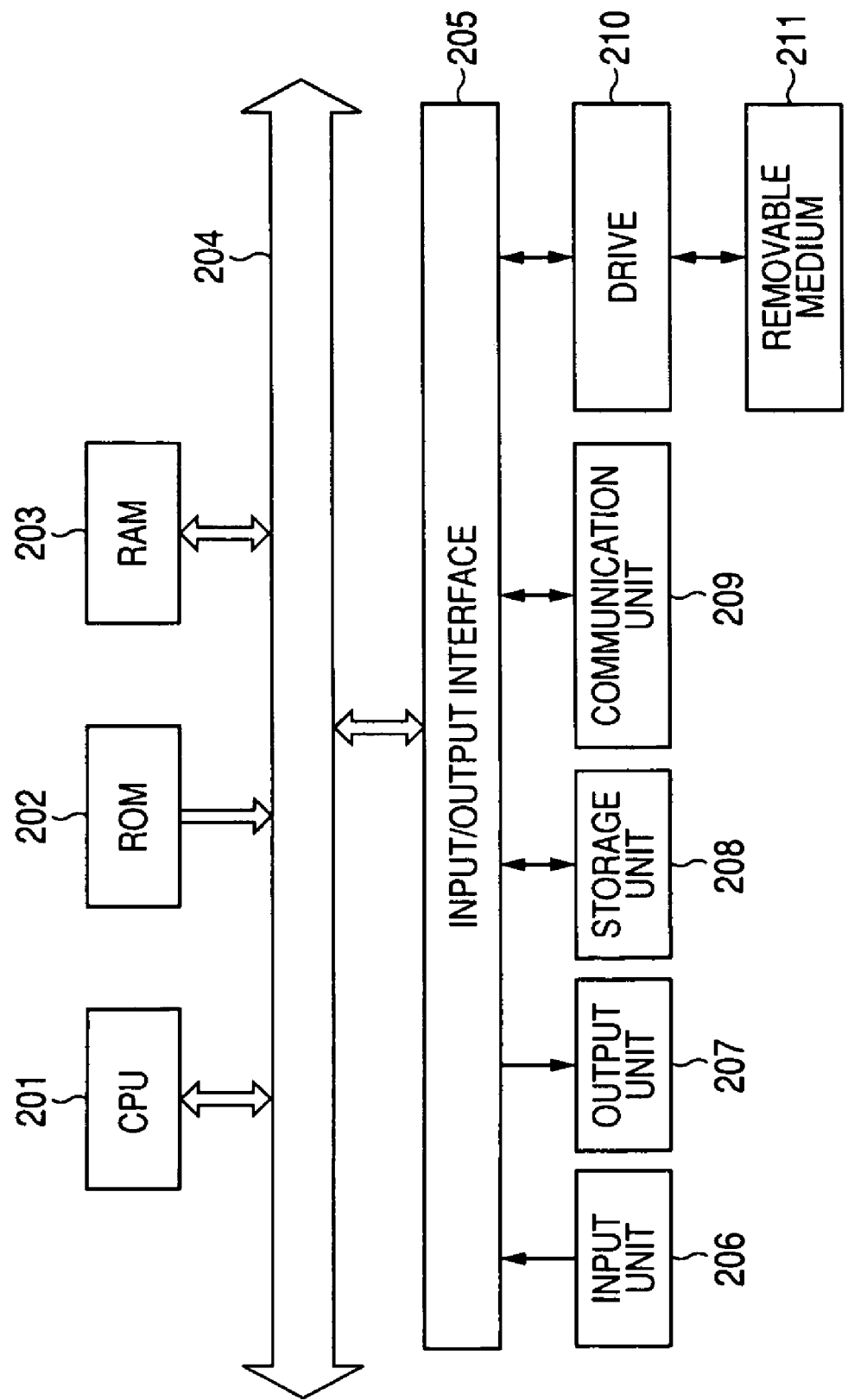
FIG. 17 is a block diagram illustrating an example of the structure of a personal computer.

FIG. 17 is a block diagram illustrating an example of the structure of a personal computer that executes the above-mentioned processes by a program. A CPU (central processing unit) 201 executes various types of processes in accordance with a program stored in a ROM (read only memory) 202 or a storage unit 208. A RAM 203 stores data or programs that are necessary for the CPU 201 to execute various types of processes. The CPU 201, the ROM 202, and the RAM 203 are connected to one another by a bus 204.

An input/output interface 205 is connected to the CPU 201 through the bus 204. The input/output interface 205 is connected to an input unit 206 including a keyboard, a mouse, and a microphone, and an output unit 207 including a display and a speaker. The CPU 201 performs various types of processes in response to instructions input from the input unit 206. Then, the CPU 201 outputs the processed result to the output unit 207.

The storage unit 208 connected to the input/output interface 205 includes a hard disk and stores various data and programs executed by the CPU 201. A communication unit 209 communicates with external apparatuses through a network, such as the Internet or a local area network.

In addition, programs may be acquired by the communication unit 209 and then stored in the storage unit 208.

When a removable medium 211, such as a magnetic disk, an optical disc, a magneto-optical disk, or a semiconductor memory, is inserted, a drive 210 connected to the input/output interface 205 drives the removable medium and acquires the programs and data recorded thereon. The acquired programs and data are transmitted to and stored in the storage unit 208, if necessary.

As shown in FIG. 17, a program recording medium that stores programs that are installed in a computer and is executable by the computer may be the removable medium 211, the ROM 202 that temporarily or permanently stores the programs, or a hard disk forming the storage unit 208. The removable medium 211 is a package medium including a magnetic disk (including a flexible disk), an optical disc (including CD-ROM (compact disc-read only memory) and DVD (digital versatile disc)), a magneto-optical disk, and a semiconductor memory. The programs are stored in the program recording medium using wired or wireless communication media through the communication unit 209, if necessary. The communication unit 209 is an interface, such as a router or a modem. The communication media includes a local area network, the Internet, and digital satellite broadcasting.

Further, in this specification, steps defining a program stored in the program recording medium are not necessarily performed in time series in accordance with the written order. The steps may be performed in parallel or independently without being performed in time series.

Although the exemplary embodiment of the invention has been described above, the invention is not limited thereto, but various modifications and changes can be made without departing from the spirit and scope of the invention. For example, in the above-described embodiment, the invention is applied to the object recognition apparatus, but the invention is not limited thereto. For example, the invention can be applied to an information processing apparatus that compares and recognize an object in an image.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that compares a query image and a model image and provides support information for discriminating a subject of the model image from a subject of the query image, the apparatus comprising:
   a feature point extracting means extracting one or more feature points from the model image;
   a feature describing means describing features of the one or more feature points extracted by the feature point extracting means; and
   a discrimination capability value calculating means generating correlation images among the features described by the feature describing means, the extracted model image, and one or more other model images for the one or more feature points extracted by the feature point extracting means, and calculating a discrimination capability value indicating the degree of contribution to discriminating the subject of the model image on the basis of the correlation images.

2. The information processing apparatus according to claim 1, further comprising:
   a support point selecting unit using at least one of the one or more feature points extracted by the feature point extracting unit as a base point, and selecting, as a support point, the feature point whose discrimination capability value, which is calculated by the discrimination capability value calculating unit, is higher than that of the base point from the feature points in a predetermined range of the base point.

3. The information processing apparatus according to claim 1,
   wherein the discrimination capability value calculating unit calculates the discrimination capability value on the basis of at least one of the average value and the maximum value of all the correlation images.

4. An information processing method of an information processing apparatus that compares a query image and a model image and provides support information for discriminating a subject of the model image from a subject of the query image, the method comprising the steps of:
   extracting one or more feature points from the model image;
   describing features of the extracted one or more feature points; and
   generating correlation images among the described features, the extracted model image, and one or more other model images for the extracted one or more feature points, and calculating discrimination capability values indicating the degree of contribution to discriminating the subject of the model image on the basis of the correlation images.

5. The information processing method according to claim 4, further comprising:
   using at least one of the one or more feature points extracted by the feature point extracting unit as a base point; and
   selecting, as a support point, the feature point whose discrimination capability value, which is calculated by the discrimination capability value calculating unit, is higher than that of the base point from the feature points in a predetermined range of the base point.

6. The information processing method according to claim 4,
   calculating the discrimination capability value on the basis of at least one of the average value and the maximum value of all the correlation images.

7. An information processing apparatus that compares a query image and a model image and provides support information for discriminating a subject of the model image from a subject of the query image, the apparatus comprising:
   a feature point extracting unit configured to extract one or more feature points from the model image;
   a feature describing unit configured to describe features of the one or more feature points extracted by the feature point extracting unit; and
   a discrimination capability value calculating unit configured to generate correlation images among the features described by the feature describing unit, the extracted model image, and one or more other model images for the one or more feature points extracted by the feature point extracting unit, and calculate a discrimination capability value indicating the degree of contribution to discriminating the subject of the model image on the basis of the correlation images.

8. The information processing apparatus according to claim 7, further comprising:
   a support point selecting unit using at least one of the one or more feature points extracted by the feature point extracting unit as a base point, and selecting, as a support point, the feature point whose discrimination capability value, which is calculated by the discrimination capability value calculating unit, is higher than that of the base point from the feature points in a predetermined range of the base point.

9. The information processing apparatus according to claim 7,
   wherein the discrimination capability value calculating unit calculates the discrimination capability value on the basis of at least one of the average value and the maximum value of all the correlation images.

* * * * *